(No Model.) 2 Sheets—Sheet 1.

O. B. SHALLENBERGER.
ALTERNATING CURRENT MEASURING INSTRUMENT.

No. 531,870. Patented Jan. 1, 1895.

WITNESSES.
C. A. Longfellow
E. P. Betzel

INVENTOR
Oliver B. Shallenberger
BY
Finny & MacKaye
ATTORNEYS.

(No Model.) 2 Sheets—Sheet 2.

O. B. SHALLENBERGER.
ALTERNATING CURRENT MEASURING INSTRUMENT.

No. 531,870. Patented Jan. 1, 1895.

WITNESSES:
C. A. Longfellow
C. P. Bitzer

INVENTOR
Oliver B. Shallenberger
BY
Terry & MacKaye
ATTORNEYS.

UNITED STATES PATENT OFFICE.

OLIVER B. SHALLENBERGER, OF ROCHESTER, PENNSYLVANIA.

ALTERNATING-CURRENT-MEASURING INSTRUMENT.

SPECIFICATION forming part of Letters Patent No. 531,870, dated January 1, 1895.

Application filed November 24, 1894. Serial No. 529,875. (No model.)

*To all whom it may concern:*

Be it known that I, OLIVER B. SHALLENBERGER, a citizen of the United States, residing at Rochester, county of Beaver, State of Pennsylvania, have invented certain new and useful Improvements in Alternating-Current-Measuring Instruments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates to the class of apparatus known as alternating current measuring instruments.

The object of the invention is to provide a convenient and reliable apparatus for indicating the current or difference of potential upon an alternating current circuit.

In other applications filed by me on the 19th day of September, 1894, Serial Nos. 523,515 and 523,516, I have described and claimed certain inventions which are fundamental to the construction and operation of the apparatus herein described, and this case relates particularly to special applications involving some of the principles.

The general plan of operation upon which the apparatus depends involves the employment of two magnetic fields developed by currents differing in phase, and subjecting a moving element to the resultant action of these two fields, and indicating the amount of the resultant motion thus produced.

The invention will be described in connection with the accompanying drawings, in which—

Figure 1:
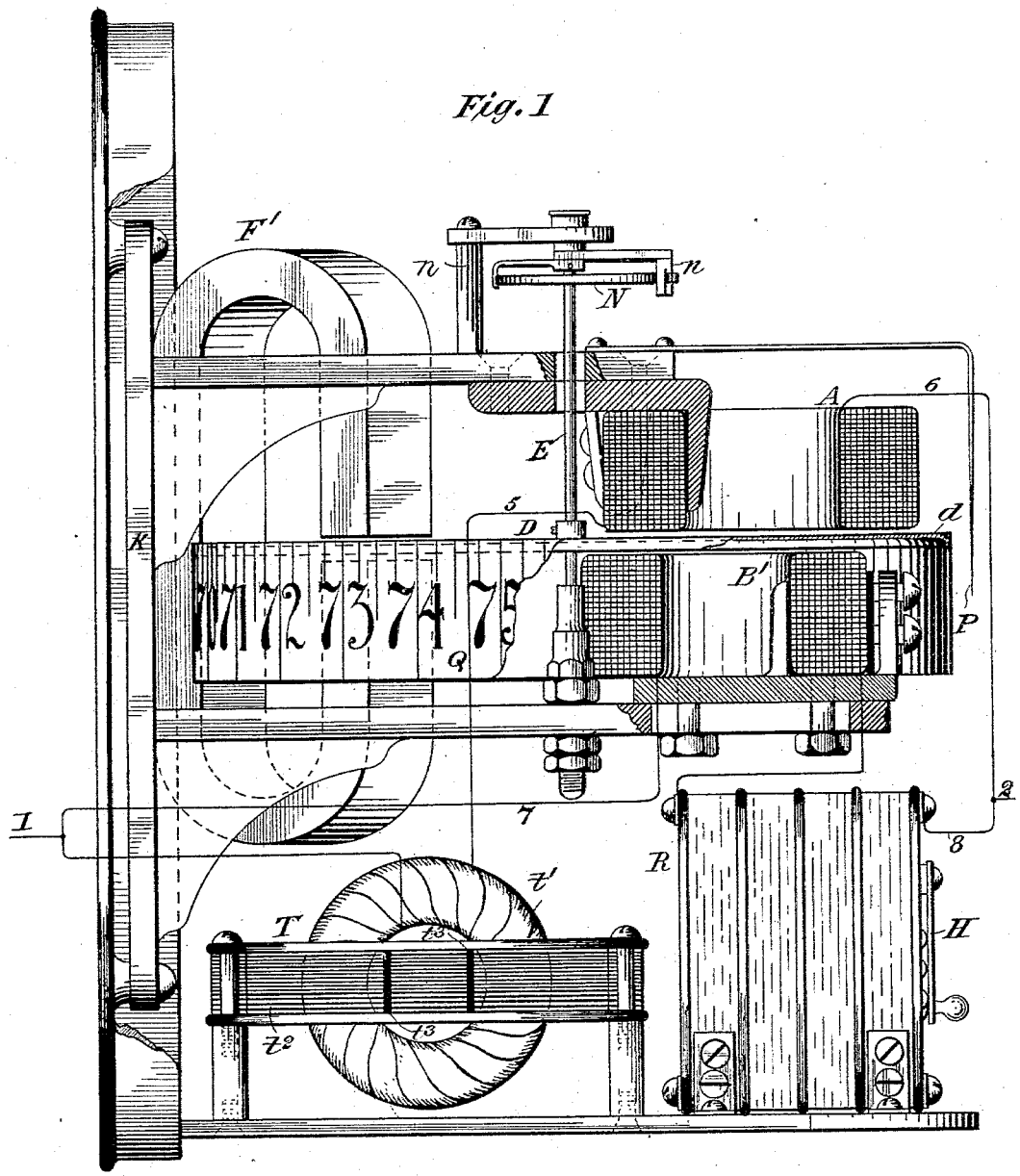
Figure 2:
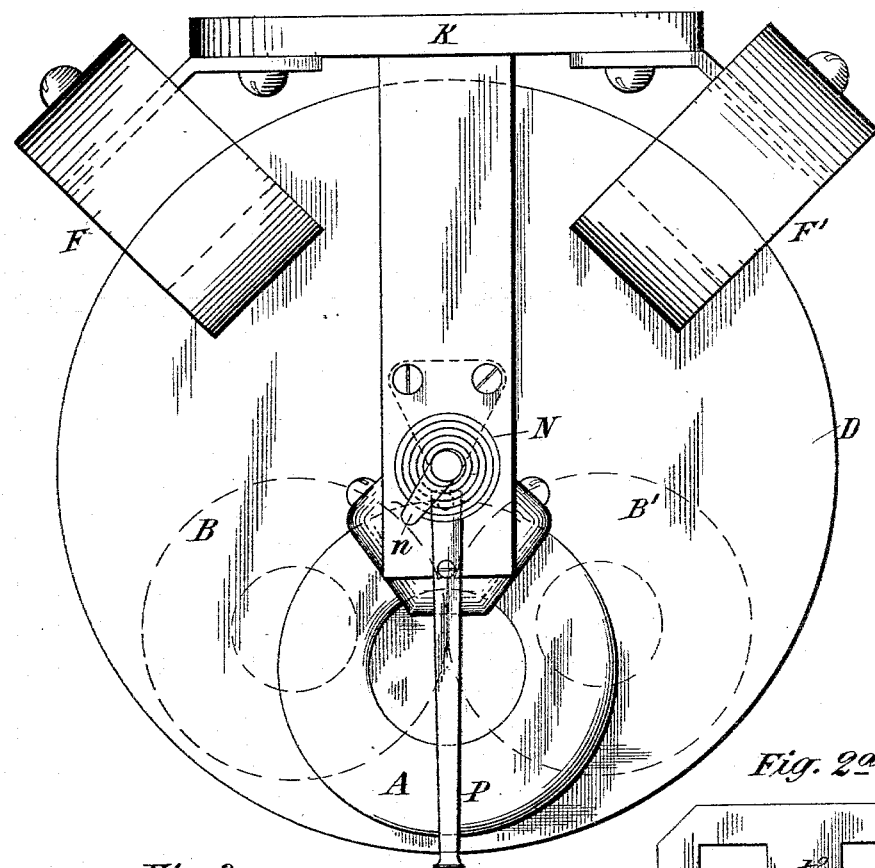
Figure 2A:
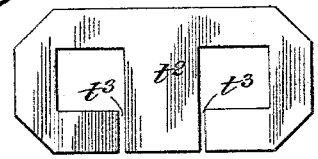
Figure 3:
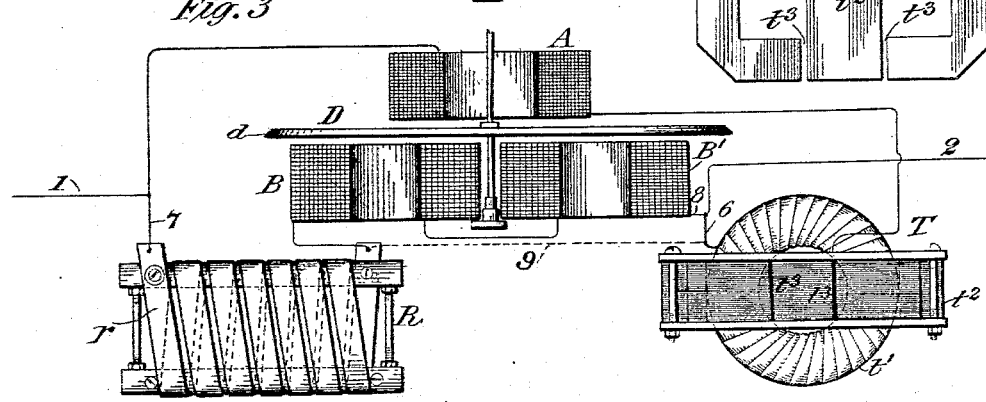

Figure 1 is a side elevation, illustrating the construction of the apparatus and its connections with an alternating current circuit. Fig. 2 is a plan of the meter. Fig. 2$^a$ is a detail. Fig. 3 is a diagram illustrating the organizations of the circuits.

Referring to the drawings, A represents an inducing coil, connected in a conductor 5, 6; and B, B' a second inducing coil or pair of inducing coils connected in a conductor 7, 8. An inductance coil, T, described and claimed in my application, Serial No. 523,516, is connected in series with the coil A, and a suitable non-inductive resistance, R, is connected in series with the coils B, B'. The conductors 5, 6 and 7, 8, are connected in parallel between the conductors 1, 2, which convey the actuating current. The various parts of the meter are supported by a frame K. The coils A and B, B' may be adjustable with reference to each other. These coils are so located that the magnetic axis of the coil A is approximately midway between the axes of the coils B B'. Between the coils A and B, B', is placed an armature D, which is mounted upon a shaft E and is free to rotate. The armature D may be of aluminium, copper or other conducting metal. I have found that almost any metal of reasonably high conductivity is suitable for the construction of this disk; but aluminium has certain advantages on account of its high conductivity relatively to its weight, so that the disk may be made sufficiently rigid without introducing excessive friction and without liability of injury to the bearings. In order to increase the rigidity of the disk, the edge may be turned over slightly, as shown at $d$, or it may be otherwise corrugated or ribbed by which means the vibration due to the alternating current is suppressed. The shaft E turns in suitable bearings and is provided with any suitable form of indicating device, as will be presently described. The non-inductive resistance coil R, which is connected in series with the coils B, B', may, in some cases, be made adjustable by means of a switch arm or equivalent device H for including more or less of its length in circuit.

The rotation of the shaft E is opposed by a spiral spring N, one end of which is attached to the shaft and the other to an adjustable support $n$. Suitable damping magnets F, F' have their poles presented to opposite sides of the disk D in such a relation as to produce eddy currents therein when the disk is rotated. These magnets have no effect upon the indications of the instrument, except that of damping the oscillations and bringing the moving parts promptly to rest. A scale Q is employed for noting the position of the disk.

This scale may be attached to the disk, and its position noted by reference to a fixed index P, as shown in the drawings.

It is important to so locate the coil A with reference to the coils B, B' that the currents induced in the disk D by the coil A shall be within the magnetic field of the coils B, B' and vice versa. I have found, however, that the relative positions of the coils may be varied considerably without seriously affecting the operation of the meter, and one or more of these coils may be made adjustable in position if desired for the purpose of correcting the constant. It is not necessary to employ three coils, as one coil B or B' alone may be used in connection with the coil A. I have found, however that the arrangement shown in Figs. 1 and 2 is convenient and desirable in practice.

If there is any considerable difference in the coefficients of self-induction of the circuits including the coils A, and B, B', a sufficient difference of phase will exist between the currents in these two circuits to cause the disk to rotate when an alternating electro-motive force is applied to the extremities of the circuits, and even for a moderate difference of phase, satisfactory results can be obtained under certain conditions in which the periodicity is nearly constant and the range of electromotive force of moderate amount. In order, however, to secure the best results, I have found it of advantage to so organize the two circuits as to obtain as nearly as possible ninety degrees difference of phase between the two currents and for this purpose I employ the specially designed inductance coil heretofore referred to. The construction and proportions of this inductance coil are also adapted to secure other important results, as will be described. This inductance coil consists of a coil of insulated wire $t'$ having a laminated iron core $t^2$ with a relatively small interposed air-gap $t^3$. This air-gap is so proportioned with relation to the laminated core as to interpose a relatively large magnetic resistance into the circuit so that a magnetizing current of considerable amount may be employed without magnetizing the iron core to an undersirable extent. The proportions may be such that the magnetizing current required for the air-gap is many times that required for the magnetization of the iron alone, so that the variations of current as related to induction in the magnetic circuit will not be practically disturbed by hysteresis and varying permeability in the iron. The result of such proportioning is to obtain a current through the inductance coil very nearly proportional to the difference of potential applied to the circuit in which it is included, provided the resistance of the winding of the coil $t'$ and of the coil A, be made small relatively to the self-induction of the circuit. It also results from this construction that the current is inversely proportional to the periodicity and that the wave form of the current is practically that of the impressed electromotive force, while at the same time the waves of current are retarded, as before stated, nearly ninety degrees behind the impressed electromotive force.

For a given periodicity and difference of phase between the currents in the coils A and B, B', the torque exerted upon the disk D is proportional to the product of the two currents traversing the coils. Hence for a given periodicity the torque is proportional to the square of the electromotive force applied. I have found, however, that as the periodicity varies the torque varies in the same proportion when the currents in the actuating coils are maintained the same and have the same phase relation. For this reason the indications are maintained correct under variations of periodicity by means of the corresponding variation of current in the circuit 5, 6, through the inductance coil, which is in inverse ratio to the periodicity and consequently compensates for the varying effect upon the disk. Owing to these effects, I have found that the indications of the instrument are correct even when used in connection with currents of widely differing periodicities. The range of movement may be almost indefinitely great, since the angle of deflection is not limited, but in each position taken by the armature the relation of the moving parts to the actuating coils remains the same. This feature is of very great importance because it makes it possible to construct an instrument having a large range of movement.

In order to utilize the advantages of a very large angular deflection to the fullest extent, I find it of advantage to employ a scale attached to and moving with the disk, so that the indications may be easily observed from a given point of view. This construction is particularly advantageous in connection with the form of instrument shown in the figures having the shaft vertical; but may also be employed in connection with other forms of construction. This scale may be formed of any convenient material of sufficient stiffness and of reasonably light weight. Since the indications are proportional to the square of the difference of potential applied the scale may be divided according to the law of squares, and the instrument adjusted to the proper constant after the scale is applied. The indications will then be correct throughout its range. The scale may also be so arranged that the armature may make more than one complete rotation, thus increasing the sensitiveness and range of the instrument. In practice the form and particular construction of the armature and the arrangements of the inducing coils may be variously modified without departing from the invention.

In order that the resistance of the coil R may quickly reach a constant value, for a given current, it is desirable to construct it of a form which shall have a large radiating surface. The form shown in Fig. 3 in which a thin strip of metal r is used is an example of this construction which is particularly adapted for an ampère meter. When constructed as shown in Fig. 3, the indication of the instrument for any given temperature of the surrounding air reaches an accurate value almost immediately. When, however, the temperature of the surrounding air varies from that at which the instrument was calibrated there is a corresponding variation in the resistance of the conducting circuit of the armature which would result in a variation of the reading of the instrument. In order to compensate for this variation it is preferable to construct the non-inductive resistance of a metal having approximately the same temperature co-efficient of resistance as the conducting circuit of the armature. When constructed in this way a rise of temperature in the surrounding air causes an increase in the non-inductive resistance proportional to the increase of resistance in the armature so that a proportionally larger amount of current is caused to pass through the inductance coil and the coil A, thus effecting a proper degree of compensation. In order that this compensation for temperature should be as correct as possible it is desirable to so proportion the windings as to reduce the current through the inductive circuit and the coil A to a small fraction of the current through the non-inductive resistance and the coils B, B'. In the case of a volt meter, however, the current in the two branches is preferably more nearly equal, and the current through the circuit 5, 6, is not influenced by changes in the resistance of the circuit 7, 8, when connected in the ordinary way as shown in Fig. 1. In this use of the instrument the compensation for temperature may be obtained by the use of the non-inductive resistance whose temperature co-efficient is the converse of that of the temperature co-efficient of the armature circuit, so that as a rise of temperature, for instance tends to reduce the torque owing to an increase of armature resistance, a proper compensation is effected by a reduction of resistance in the circuit 7, 8, and a consequent increase of current is obtained. This compensation may also be effected by adjusting the resistance G, by means of the device H.

Instead of connecting the coil A in shunt upon the coils B, B', and the non-inductive resistance R, it may be connected in shunt upon the non-inductive resistance R only, as shown by the dotted line 9, in Fig. 3. This organization, however, is usually not so desirable as that already described, for the reason that the union of the current through the coil A, with that through the non-inductive resistance R, tends to reduce the difference of phase between the two sets of coils. When the instrument is employed as an ampère meter, however, since it is desirable to so proportion the various parts as to cause the greater part of the current to pass through the non-inductive resistance R, this fact does not result in a sufficient modification of the phase relations to interfere with the usefulness of the instrument to a material extent. The chief advantage of this method of connection lies in the fact that the coils B, B', do not then constitute a part of the resistance circuit and consequently do not introduce an error due to the slowness with which their variations of temperature follow the changes of current. In practice, however, by properly proportioning the resistance of the coils B and B' to the maximum current this error may be reduced so low that it becomes negligible. For this reason I usually prefer the arrangement shown in full lines.

I claim as my invention—

1. In an electric meter the combination of an armature comprising a closed conducting circuit, an actuating coil in inductive relation thereto, an inductance coil connected in series with said actuating coil, a second actuating coil, a non-inductive resistance in series therewith and means for determining the mechanical effect produced by the passage of alternating currents through said actuating coils.

2. In an electric meter the combination of an armature comprising a closed conducting circuit, an actuating coil in inductive relation thereto, an inductance coil comprising a winding connected in series with said actuating coil and a subdivided core containing an air gap; a second actuating coil, a non-inductive resistance in series therewith, and means for determining the mechanical effect produced by the passage of alternating currents through said actuating coils.

3. In an electric meter the combination of an armature comprising a closed conducting circuit, an actuating circuit including an actuating coil and an inductance coil, a second actuating circuit including an actuating coil and a non-inductive resistance, said actuating circuits being connected in parallel.

4. In an electric meter the combination of an armature comprising a closed conducting circuit, an actuating circuit including an actuating coil and an inductance coil, a second actuating circuit including an actuating coil and a non-inductive resistance, said actuating circuits being connected in parallel, and means for indicating the resulting movement against an opposing force of definitely varying effect.

5. The combination of an armature comprising a closed conducting circuit, an actuating circuit including an actuating coil and an inductance coil, a second actuating circuit, including an actuating coil and a non-inductive resistance, said actuating circuits being connected in parallel, a damping device applied to reduce the oscillations of the armature, and means for indicating the deflection against an opposing force which increases with the deflection.

6. The combination of a conducting disk mounted on a shaft capable of rotation, a graduated scale carried thereby an actuating circuit of high self induction inductively related to said disk, a second actuating circuit of low self induction, also inductively related to said disk, a spring attached to said shaft tending to oppose its rotation, and a damping magnet applied to reduce the oscillations.

7. In an alternating current meter the combination of a movable element and suitable indicating devices, with two actuating circuits and their respective actuating coils, one of said circuits receiving currents proportional to the electromotive force impressed upon it independently of the periodicity, the other of said circuits receiving currents directly proportional to the impressed electro motive force and inversely proportional to the periodicity.

8. In an alternating current meter the combination of a movable element operated inductively, actuating circuits connected in parallel, a non-inductive resistance included in one of said circuits and an inductance coil included in the other circuit, said inductance coil comprising a winding of relatively low resistance having a nearly closed subdivided iron core with an interruption or air gap which air gap constitutes the principal element of reluctance in the magnetic circuit of said inductance coil.

9. In an alternating current meter, operated by the inductive effects of two currents differing in phase, the method of compensating for changes of periodicity which consists in maintaining one of said currents proportional to the difference of potential independently of the periodicity, and causing the other to vary by its self-inductive action, inversely as the periodicity, and to vary also in direct proportion to the difference of potential.

10. The combination of an armature comprising a closed conducting circuit, an actuating circuit including an actuating coil and a coil of relatively high self induction in series therewith, a second actuating circuit including an actuating coil and a relatively high non-inductive resistance in series therewith, the temperature co-efficient of the non-inductive resistance being approximately the same as that of the closed conducting circuit of the armature, said actuating circuits being connected in parallel.

11. The combination of an armature comprising a closed conducting circuit, an actuating circuit including an actuating coil and a coil of relatively high self-induction in series therewith, a second actuating circuit including an actuating coil and a relatively high non-inductive resistance in series therewith, the temperature co-efficient of the non-inductive resistance being so related to that of the armature as to vary the actuating current inversely as the current induced in the closed conducting circuit of the armature is varied by changes of temperature.

12. In a meter for alternating current circuits, the combination of a closed conductor capable of rotation, actuating circuits therefor connected in parallel, one of said circuits including an inductive resistance, and the other including a non-inductive resistance having a temperature co-efficient approximately equal to that of the said closed conductor.

In testimony whereof I affix my signature in presence of two witnesses.

OLIVER B. SHALLENBERGER.

Witnesses:
GRACE M. FINLEY,
CHARLES A. TERRY.